United States Patent

Pedemonte

(10) Patent No.: US 6,624,291 B2
(45) Date of Patent: Sep. 23, 2003

(54) YELLOW-REACTIVE MONOAZO DYES CONTAINING A TERTIARY OR A QUARTERNARY NITROGEN GROUP, METHODS FOR THEIR PREPARATION AND USE THEREOF FOR DYEING HYDROXY-AND/OR CARBOXAMIDO-CONTAINING FIBER MATERIAL

(75) Inventor: Ronald Pedemonte, Wesley Chapel, NC (US)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 21 days.

(21) Appl. No.: 09/911,590

(22) Filed: Jul. 24, 2001

(65) Prior Publication Data

US 2002/0042959 A1 Apr. 18, 2002

Related U.S. Application Data

(60) Provisional application No. 60/220,742, filed on Jul. 25, 2000.

(51) Int. Cl.[7] .................. C09B 62/085; C09B 62/51; D06P 1/382; D06P 1/384
(52) U.S. Cl. .................. 534/604; 534/605; 534/612; 534/638; 534/642; 8/549
(58) Field of Search .................. 534/605, 612, 534/638, 642, 604; 8/549

(56) References Cited

U.S. PATENT DOCUMENTS

| 2,657,205 A | 10/1953 | Heyna et al. | 260/185 |
| 4,257,770 A | 3/1981 | Nishimura et al. | 8/549 |
| 4,908,436 A | 3/1990 | Scheibli | 534/637 |
| 5,225,544 A | * 7/1993 | Dannheim et al. | 534/642 |
| 5,274,083 A | 12/1993 | Herd et al. | 534/618 |
| 5,405,415 A | 4/1995 | Reiher et al. | 8/549 |
| 5,445,654 A | 8/1995 | Hussong et al. | 8/546 |
| 5,456,727 A | 10/1995 | Heimling et al. | 8/549 |
| 5,484,899 A | 1/1996 | Deitz et al. | 534/618 |
| 5,514,782 A | 5/1996 | Dannheim | 534/638 |
| 5,565,553 A | 10/1996 | Deitz et al. | 534/612 |
| 5,611,821 A | 3/1997 | Huang et al. | 8/549 |
| 6,171,348 B1 | 1/2001 | Russ et al. | 8/594 |

FOREIGN PATENT DOCUMENTS

| CA | 1221360 | 5/1987 |
| DE | 19 11 427 | 8/1978 |
| EP | 94055 | 11/1983 |
| EP | 141367 | 5/1985 |
| EP | 395951 | 11/1990 |
| EP | 0418664 | 3/1991 |
| EP | 486176 | 5/1992 |
| EP | 623655 | 11/1994 |
| EP | 630946 | 12/1994 |
| EP | 632107 | 1/1995 |
| EP | 0632107 | 1/1995 |
| EP | 647683 | 4/1995 |
| EP | 0647683 | 4/1995 |
| EP | 832 939 | 4/1998 |
| JP | 58 160362 | 9/1983 |
| KR | 94-2560 | 3/1994 |

* cited by examiner

Primary Examiner—Fiona T. Powers
(74) Attorney, Agent, or Firm—Connolly Bove Lodge & Hutz LLP

(57) ABSTRACT

Monoazo dyestuffs of the formula (1)

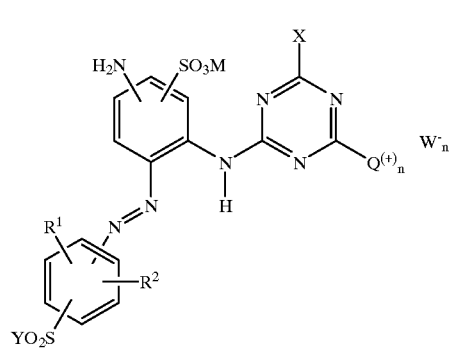

(1)

wherein

Y is vinyl or is ethyl which is substituted in the β-position by a substituent which can be eliminated by the action of an alkali, forming the vinyl group;

M, X, are groups customary to dyestuffs, $R^1$, $R^2$ is hydrogen methyl, methoxy or sulfo;

Q is cyanamido or is a group of the formula (a) or (b):

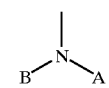

(a)

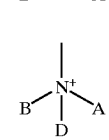

(b)

A, B, D are hydrogen, optionally substituted $C_1$–$C_6$ alkyl or phenyl, or is alternately a group of the formula (a) or (b) wherein (a) is a cyclic ring system having a tertiary nitrogen of (b) is a cyclic having a quaternary nitrogen;

n is 0 if Q is a group of the formula (a) and n is 1 if Q is a group of formula (b);

W— is a halogenide or the equivalent of a divalent anionic group;

The invention further relates to the method for preparing the dyestuff and use for dyeing.

8 Claims, No Drawings

YELLOW-REACTIVE MONOAZO DYES CONTAINING A TERTIARY OR A QUARTERNARY NITROGEN GROUP, METHODS FOR THEIR PREPARATION AND USE THEREOF FOR DYEING HYDROXY-AND/OR CARBOXAMIDO-CONTAINING FIBER MATERIAL

This application claims the benefit of Provisional Application No. 60/220,742, filed Jul. 25, 2000.

DESCRIPTION

Yellow-Reactive Monoazo Dyes Containing a Tertiary or a Quarternary Nitrogen Group, Methods for Their Preparation and Use Thereof for Dyeing Hydroxy- and/or Carboxamido-Containing Fiber Material The present invention relates to the field of fiber-reactive dyes.

Yellow reactive dyes are known from U.S. Pat. No. 5,456,727, EP 141367, 395951, 486176, 623655, 630946, 632107 and 647683. However these dyes have some deficiencies, such as poor color build-up or unsatisfactory staining behaviour of the dyeings.

With the present invention, yellow dyes of improved properties conforming to the general formula (1) have unexpectedly been found, which produce dyeings in very good color yields with excellent color build-up and consistent shade. Additionally the dyeings obtained using the inventive dyes surprisingly show no or very little staining on polyamide fibers.

The present invention provides yellow dyes conforming to the general formula (1):

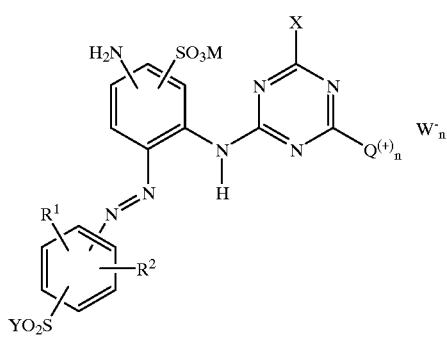

(1)

wherein
- Y is vinyl or is ethyl which is substituted in the β-position by a substituent which can be eliminated by the action of an alkali, forming the vinyl group, such as chlorine, thiosulfato, sulfato, alkanoyloxy of 2 to 5 carbon atoms, such as acetyloxy, phosphate, sulfobenzoyloxy and p-toluylsulfonyloxy, and is preferably vinyl, β-chloroethyl, β-thiosulfatoethyl or β-sulfatoethyl and is in particular vinyl or β-sulfatoethyl;
- M is hydrogen or an alkali metal, such as lithium, sodium or potassium;
- X is fluorine, chlorine, amino, $C_1$ to $C_4$ alkoxy, such as methoxy, ethoxy, propyloxy, butyloxy, or is phenoxy, or phenylamino, which may be substituted by halogen or sulfo, mono- or dialkyl amine, with $C_1$ to $C_4$ alkyl, such as methyl, ethyl, n-propyl, i-propyl, n-butyl, i-butyl, sec-butyl, tert-butyl, which may be substituted further by sulfo, sulfato or hydroxy groups, preferably amino or methoxy or fluoro and is in particular chlorine;
- $R^1$ is hydrogen, methyl, methoxy or a group of the formula $SO_3M$, preferably methoxy and in particular hydrogen;
- $R^2$ has one of the meanings of $R^1$;
- Q is cyanamido or is a group of the formula (a) or (b)

(a)

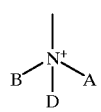

(b)

wherein
- A is hydrogen, $C_1$ to $C_6$ alkyl such as methyl, ethyl, n-propyl, i-propyl, n-butyl, i-butyl, sec-butyl, tert-butyl, pentyl or hexyl, preferably $C_1$ to $C_4$ alkyl groups, in particular methyl and ethyl, which may be substituted by hydroxy, sulfo or sulfato or is phenyl which may be substituted by one or more halogens such as chloro, fluoro or bromo, by acetamido- or by sulfo and is preferably 4-chlorophenyl and in particular 3-metanilic or 2,5-dimetanilic acid;
- B has one of the meanings of A and is preferably hydrogen, methyl or ethyl;
- D has one of the meanings of A; or the group of the formula
  - (a) is a cyclic ringsystem such as morpholino, piperidino or piperazino, in particular morpholino, or prolino;
  - (b) is a cyclic ringsystem such as N-methyl morpholinium or N-ethyl morpholinium, N-ethyl piperidinium, or is a bicyclic ringsystem such as 1,4-diaminobicyclo (2,2,2)octyl, or is pyridinium which may be substituted by carboxy, such as 3-carboxy-pyridinium or 4-carboxy-pyridinium, or by carboxamido, such as 3-carboxamidopyridinium, and is in particular 3-carboxy-pyridinium;
- n is 0 if Q is a group of the formula (a) and n is 1 if Q is a group of formula (b);
- $W^-$ is a halogenide or the equivalent of a divalent anionic group such as sulfate or carbonate and is preferably chloride or fluoride;

The groups "sulfo", "thiosulfato", "carboxy", "phosphato" and "sulfato" include both the acid form and the salt form of these groups. Accordingly, sulfo groups are groups of the formula $-SO_3M$, thiosulfato groups are groups of the formula $-S-SO_3M$, carboxy groups are groups of the formula $-COOM$, phosphato groups are groups of the formula $-OPO_3M_2$ and sulfato groups are groups of the formula $-OSO_3M$, in which M is defined as above.

The dyes of the general formula (1) can have, within the meaning of Y, structurally different fiber-reactive groups $-SO_2-Y$. In particular, the fiber reactive groups $-SO_2-Y$ are partly vinylsulfonyl groups and partly groups in which Y is a β-ethyl substituted group as defined above, such as β-chloroethylsulfonyl, β-thiosulfatoethylsulfonyl or, preferably, β-sulfatoethylsulfonyl groups. If the dye contains the respective dye component in the form of a vinylsulfonyl dye, the proportion of the respective vinylsulfonyl dye to the respective dye with Y being a β-ethyl substituted group as defined above, such as a β-chloro- or β-thiosulfato- or β-sulfatoethyl-sulfonyl dye, will be up to about 30 mol-%, based on the respective dye chromophore. Preference is given to the dyes in which the proportion of vinylsulfonyl dye to said β-ethyl substituted dye, such as β-sulfatoethylsulfonyl dye is in terms of the molar ratio between 5:95 and 30:70.

The dyes of the invention can be present as a preparation in solid or liquid (dissolved) form. In solid form they generally contain the electrolyte salts customary in the case of water-soluble and in particular fiber-reactive dyes, such as sodium chloride, potassium chloride and sodium sulfate, and also the assistants customary in commercial dyes, such as buffer substances capable of establishing a pH in aqueous solution between 3 and 7, such as sodium borate, sodium bicarbonate, sodium citrate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

If the dyes take the form of dye powders, they contain, as a rule, 10 to 50% by weight, based on the dye powder or preparation, of a strength-standardizing colorless diluent electrolyte salt, such as those mentioned above. These dye powders may in addition contain the abovementioned buffer substances in a total amount of up to 5%, based on the dye powder. If the dyes of the invention are present in aqueous solution, the total dye content of these aqueous solutions is up to about 75% by weight, the electrolyte salt content of these aqueous solutions preferably being below 10% by weight, based on the aqueous solutions (liquid preparations) and they can in general contain the abovementioned buffer substances in an amount of up to 10% by weight, preferably up to 5% by weight.

The dyes of the invention can be obtained in a conventional manner, for instance by synthesis by means of customary diazotization and coupling reactions in a manner familiar to those skilled in the art using appropriate substituted phenylamine derivatives conforming to the general formula (2)

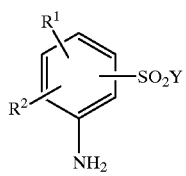

(2)

wherein Y is a alkali eliminable group and $R^1$ and $R^2$ are as defined above, and coupling components, such as diaminophenylsulfonic acid in the necessary proportions to give the diazo component of the general formula (3).

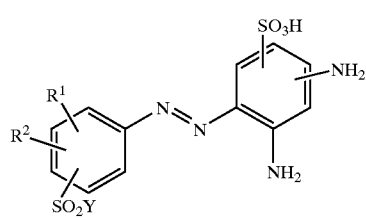

(3)

wherein $R^1$, $R^2$ and Y are as defined above.

Reacting this intermediate at pH 9,5–1,5 with cyanuric halogenide gives the azo dye conforming to the formula (4):

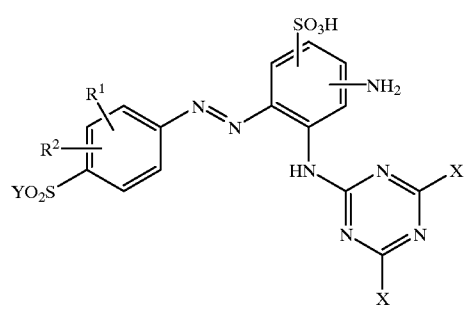

(4)

wherein X is fluorine or chlorine, and by reaction with a compound of the general formula Q' at pH 2–9 eventually under heating wherein Q' is a group of the formula:

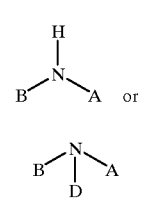

(a')

or (b')

in which

A, B, D and n are as defined above to give a claimed dyestuff of the formula (1a):

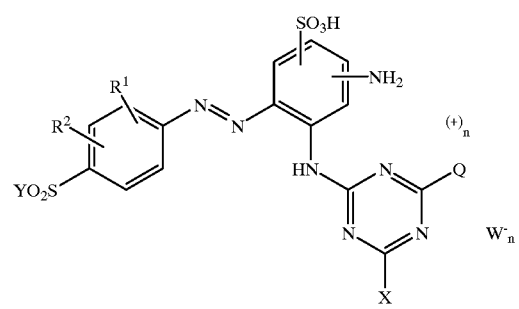

(1a)

with X, Y, W, n, Q', $R^1$ and $R^2$ as defined above, and subsequent introduction of X by substitution reaction in conventional manner if X is different of fluorine and chlorine.

The resulting dyestuff can be isolated from the solution in the conventional manner, for example by salting out with an electrolyte salt, such as sodium chloride or potassium chloride, or by spray-drying.

Dye components in form of the vinylsulfonyl dye can be prepared by the above mentioned method using appropriate vinylsulfonyl starting anilines, or alternately by reacting the dye mixture in which Y is a β-chloroethyl, β-thiosulfatoethyl, or β-sulfatoethyl radical with alkali by generally known methods. Dyes in form of a vinylsulfonyl dye within the proportion as defined above, are synthesized upon reacting the respective dye with Y being a β-chloroethyl, β-thiosulfatoethyl, β-sulfatoethyl radical with the required amount of alkali to convert said β-substituted ethylsulfonyl groups into vinylsulfonyl groups in the required proportion.

The dyes of the instant invention are well suitable for dyeing (which includes printing) hydroxy- and/or carboxamido-containing fiber materials by the application and fixing methods numerously described in the art for fiber-reactive dyes, in yellow shades with good color build-up and good wash-off in respect of unfixed dye portions. Moreover, the dyeings obtained surprisingly show very little or no staining on polyamide fibers.

The present invention therefore also provides for use of the inventive dyes for dyeing (including printing) hydroxy- and/or carboxamido-containing fiber materials and processes for dyeing such fiber materials and processes for dyeing such materials using dyes according to the invention by applying the dyes to the substrate in dissolved form and fixing the dyes on the fiber by the action of an alkali or by heating or both.

Hydroxy-containing materials are natural or synthetic hydroxy-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the inventive dyes is by generally known processes for dyeing and printing fiber materials by the known application techniques for fiber-reactive dyes. The inventive dyes are also advantageously useful in exhaust dyeing processes. Applied in this way for example to cellulose fibers from a long liquor ratio at temperatures between 40 and 105° C., optionally at temperatures up to 130° C., under superatmospheric pressure, and optionally in the presence of customary dyeing assistants with the use of acid-binding agents and optionally neutral salts, such as sodium chloride or sodium sulfate, they produce dyeings in very good color yields with excellent color build-up and consistent shade. One possible procedure is to introduce the material into the warm bath, gradually heat the bath to the desired dyeing temperature, and complete the dyeing process at that temperature. The neutral salts which speed up the exhaustion of the dyes can also if desired not be added to the bath until the actual dyeing temperature has been reached.

Similarly, the conventional printing processes for cellulose fibers, which can either be carried out in single-phase, for example by printing with a print paste containing sodium bicarbonate or some other acid-binding agent and the colorant, and subsequent steaming at from 100 to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquour and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dyes of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

Acid-binding agents for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the inventive dyes with the acid-binding agents with or without heating bonds the dyes chemically to the cellulose fiber; especially the dyeings on cellulose, after they have been given the usual aftertreatment of rinsing to remove unfixed dye portions, show excellent wet fastness properties, in particular since the unfixed dye portions are readily washed off because of their good cold water solubility. The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

The examples which follow illustrate the invention. Parts and percentages are by weight, unless otherwise stated.

EXAMPLE 1 a. 281 parts 4-β-sulfatoethyl-anilin are suspended in 1000 parts water and 232 parts conc. hydrochloric acid are added thereto. The mixture is cooled to 0° C. and is diazotized by addition of 200 parts of a 5 molar solution of sodium nitrite. After stirring for 1 hour at this temperature excess nitrite is destroyed by the addition of urea.

b. 188 parts 2,4-diamino phenylsulfonic acid are dissolved in 1000 parts of water at pH 7 at and the diazo solution a) is added hereto at a temperature of 0° C. Then the reaction is set to pH 5–9 and 184 parts cyanuric chloride are added. The pH is held between 5 and 9 and after completion of the reaction salt is added to precipitate the dye intermediate which in form of the free acid has structure (A):

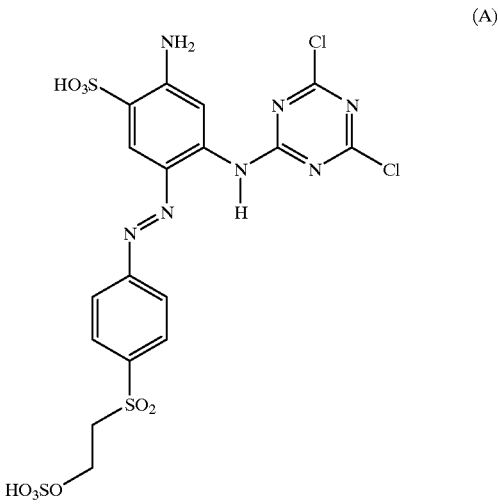

(A)

c. Intermediate (A) is dissolved in 1000 parts water at pH 7 and 123 parts nicotinic acid are added while maintaining the pH with lithiumcarbonate in a range between 5 and 9 and a temperature of 10–60° C. Spray drying yields the lithium salt form of dye (B):

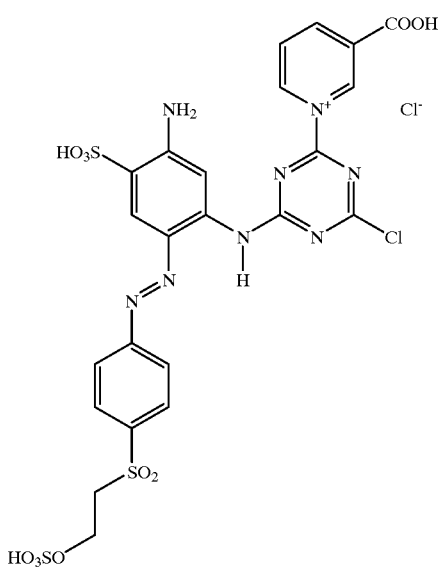

(B)

EXAMPLE 2

To one mol of dye intermediate (A) prepared as described above are added 112 parts 1,4-diamino bicyclo (2,2,2) octane, while maintaining the pH between 5–9. Drying of the dye solution yields dyestuff (C):

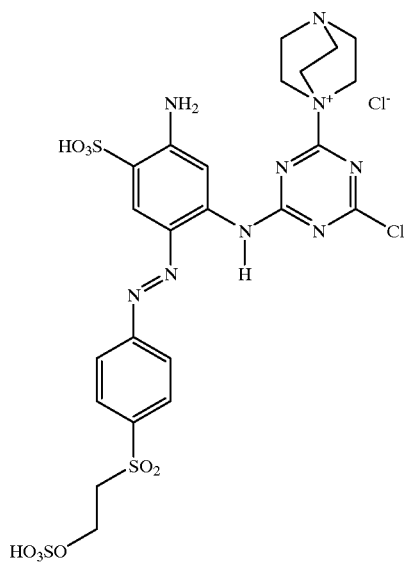

(C)

EXAMPLE 3

A solution of 341 parts of 2,5-dimethoxy-4-β-sulfatoethylaniline are diazotized as described in example 1a. The resulting diazo compound is coupled as described in 1b) and the acylated with 135 parts cyanuric fluoride at pH 5–8 and 0° C. After 30 minutes morpholine is added at pH 6–8 and the pH is maintained by addition of soda to afford after spraydrying the sodium salt of dyestuff (D):

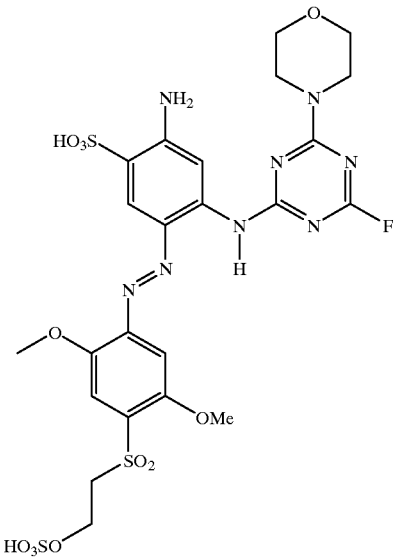

(D)

EXAMPLE 4

Treatment of the intermediate (A) with 2,5 dimetanilic acid at pH 7 and room temperature in water followed by the addition of isonicotinic amide and heating at pH 7 results in the formation of dyestuff (E), which can be salted out:

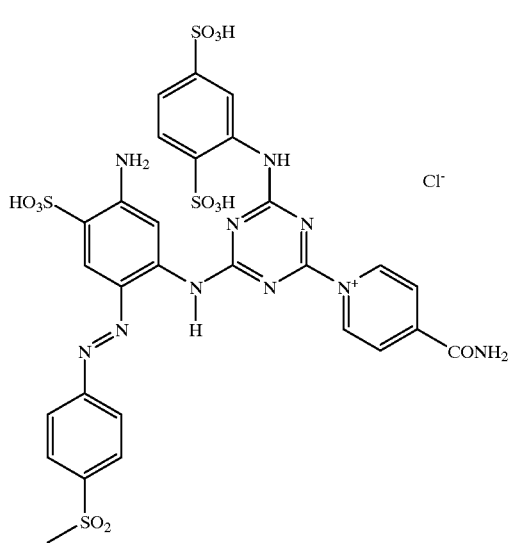

(E)

EXAMPLES 5–28
Using the method described above the following dyestuffs can be prepared:
| Example | Structure |
|---|---|
| 5 | 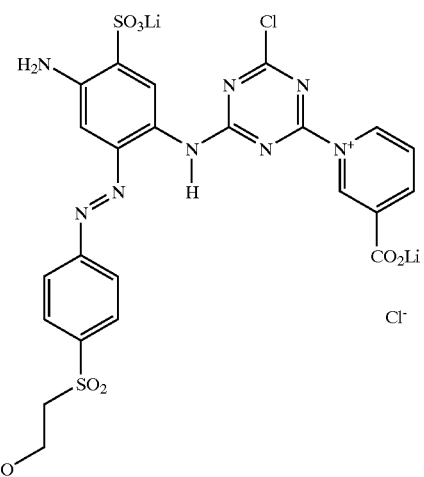 |
| 6 | 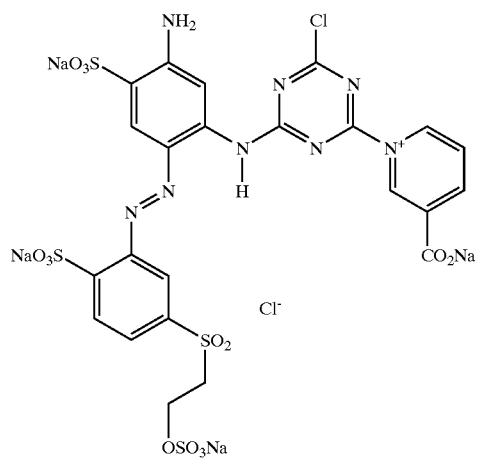 |
| 7 | 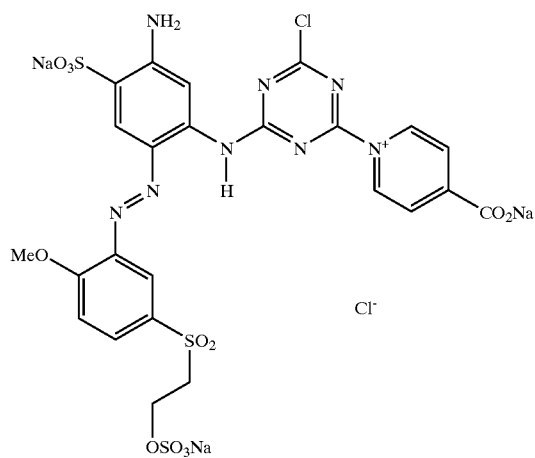 |

-continued
| Example | Structure |
|---|---|
| 8 | 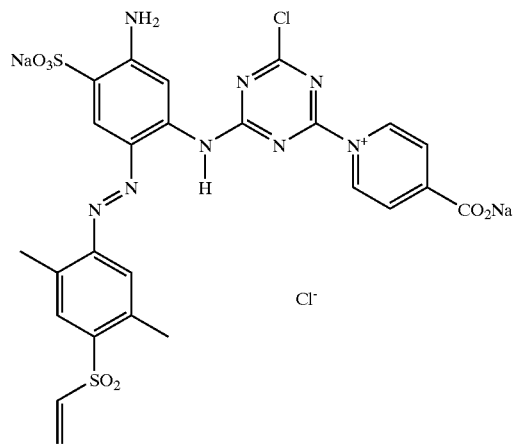 |
| 9 | 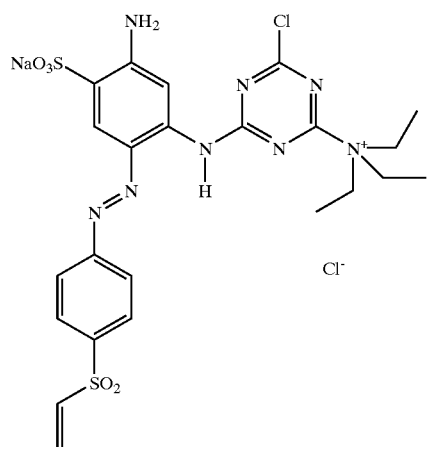 |
| 10 | 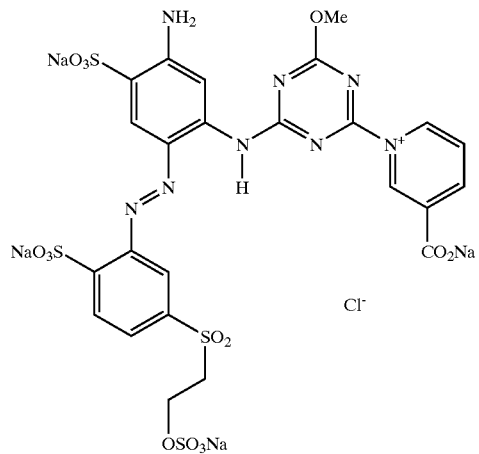 |

-continued
| Example | Structure |
|---------|-----------|
| 11 | 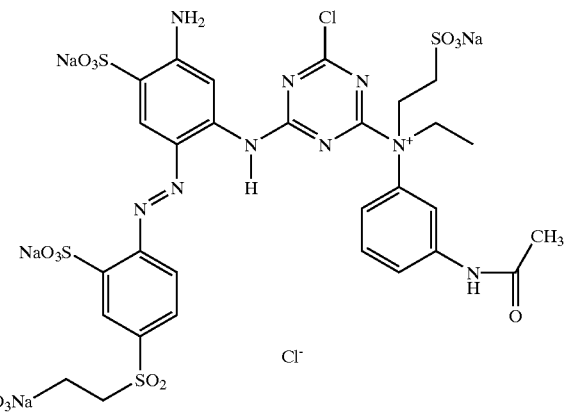 |
| 12 | 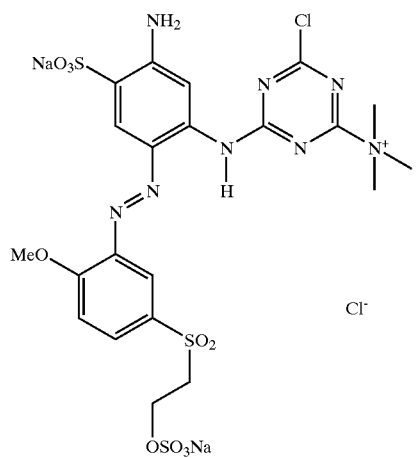 |
| 13 | 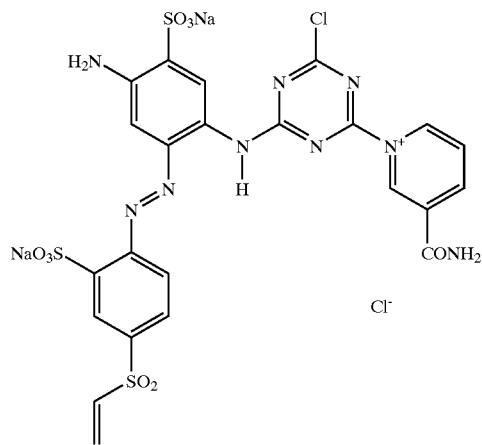 |

-continued
| Example | Structure |
|---------|-----------|
| 14 | 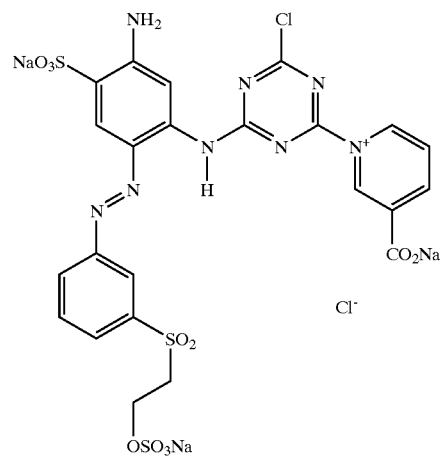 |
| 15 | 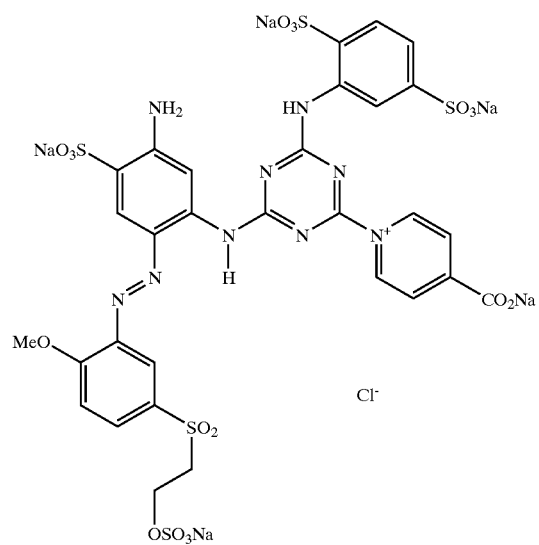 |
| 16 | 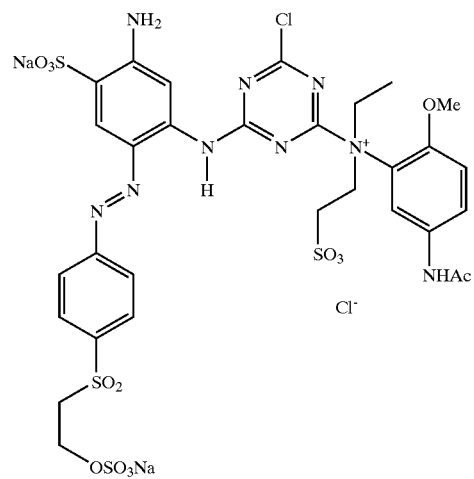 |

-continued
| Example | Structure |
|---------|-----------|
| 17 | 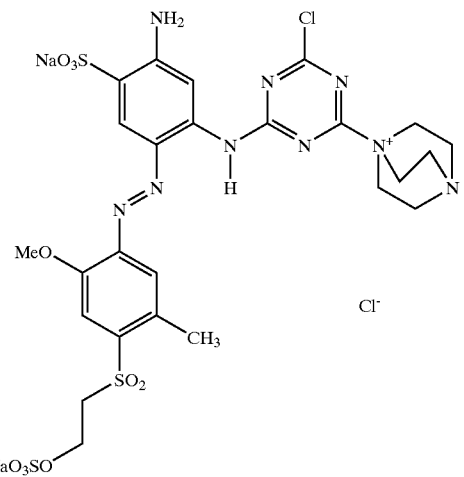 |
| 18 | 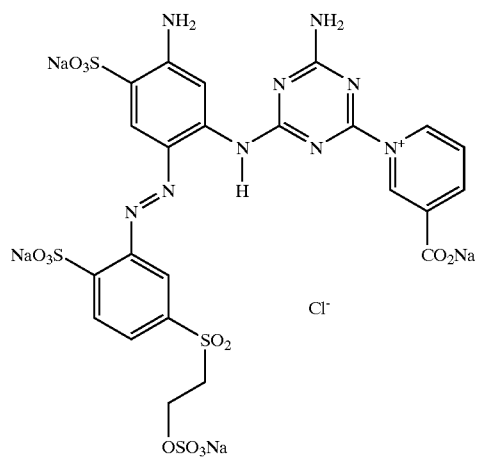 |
| 19 | 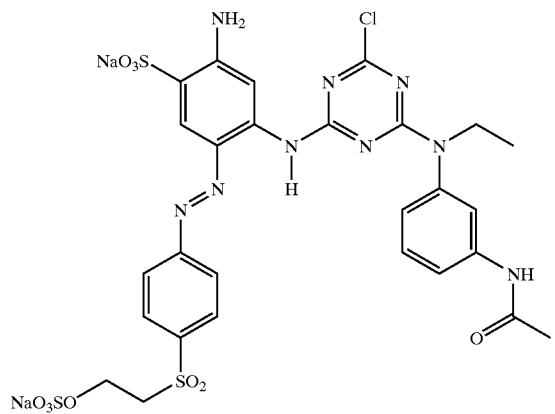 |

-continued
| Example | Structure |
|---------|-----------|
| 20 | 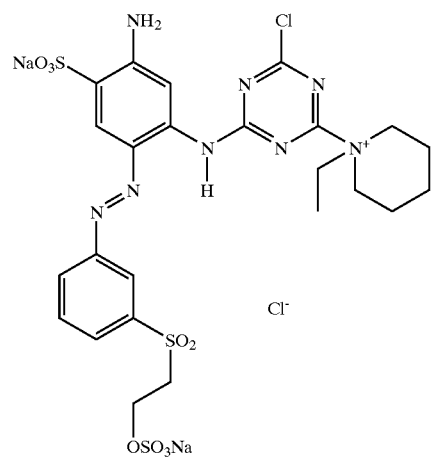 |
| 21 | 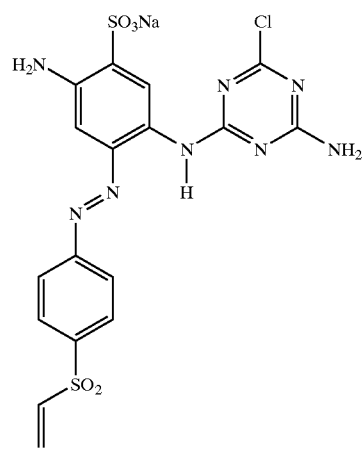 |
| 22 | 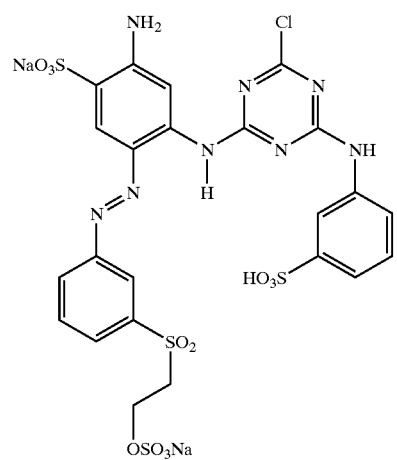 |

-continued
| Example | Structure |
|---|---|
| 23 | 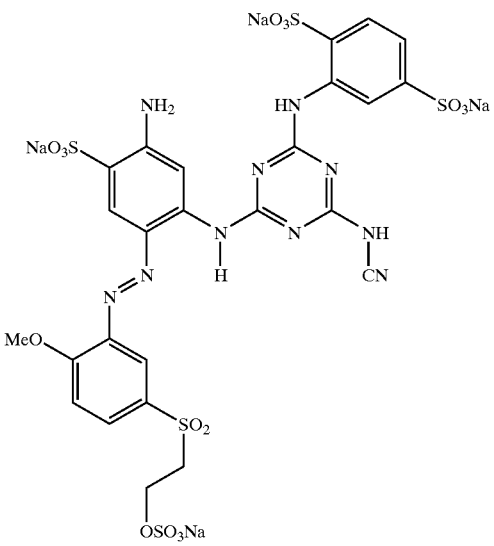 |
| 24 | 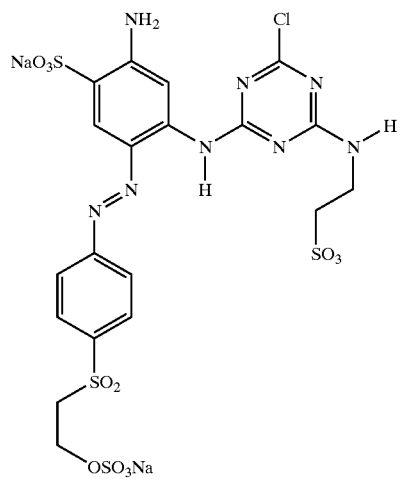 |
| 25 | 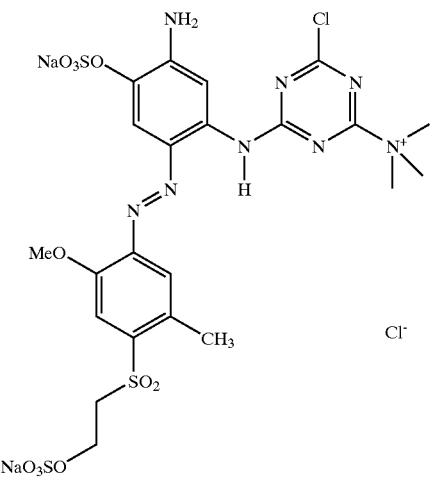 |

-continued
| Example | Structure |
|---|---|
| 26 | 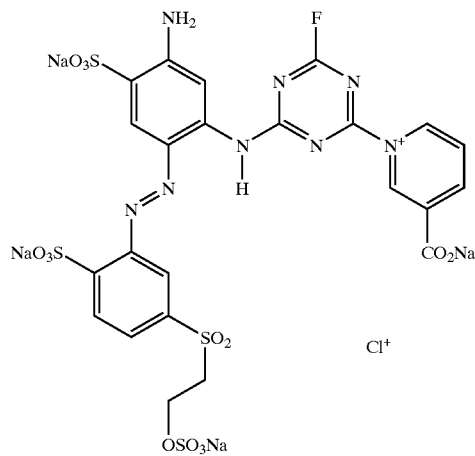 |
| 27 | 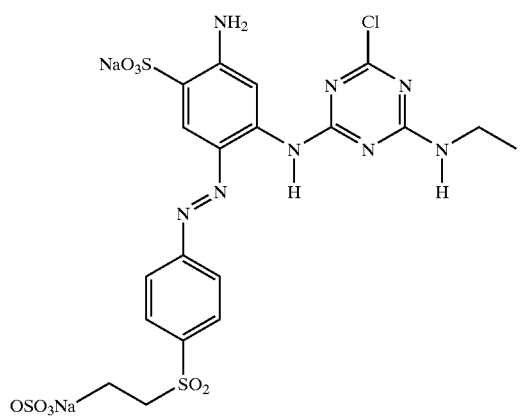 |
| 28 | 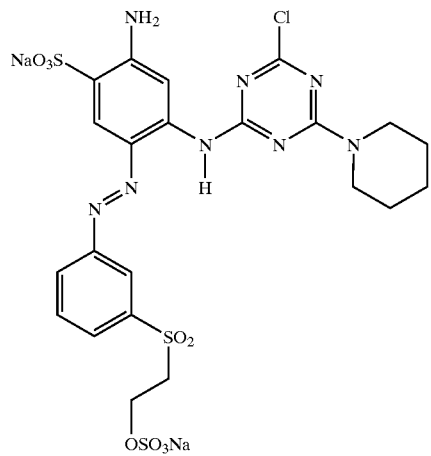 |

| Example | Structure |
|---------|-----------|
| 29 | 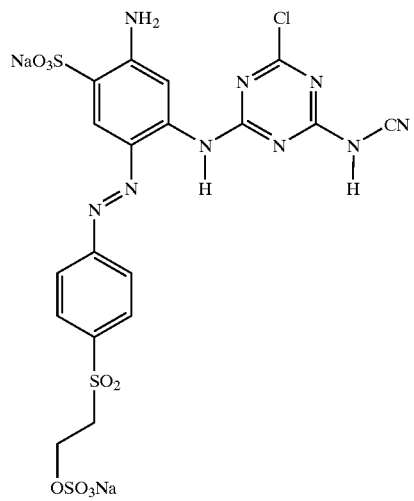 |

I claim:
1. A monoazo dyestuff of the formula (1):

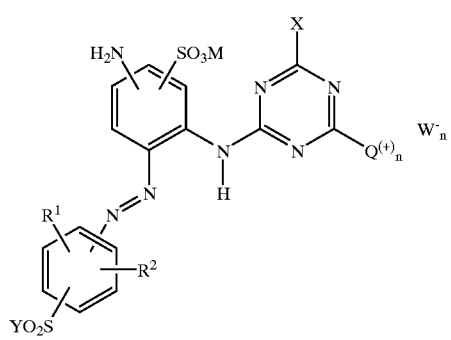

wherein
Y is vinyl or is ethyl which is substituted in the β-position by a substituent which can be eliminated by the action of an alkali, forming the vinyl group;
M is hydrogen or an alkali metal;
X is fluorine, chlorine, amino, $C_1$ to $C_4$ alkoxy, phenoxy, unsubstituted anilino, or anilino which is substituted by a halogen or sulfo group, a mono-$C_1$–$C_4$ alkyl amino, or di-$C_1$ to $C_4$ alkyl amino, wherein said $C_1$ to $C_4$ alkyl is optionally substituted by sulfo, sulfato or hydroxy groups;
$R^1$ is hydrogen methyl, methoxy or sulfo;
$R^2$ has one of the meanings of $R^1$;
Q is a group of the formula (b):

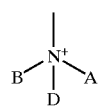

wherein
A is hydrogen, unsubstituted $C_1$–$C_6$ alkyl, or $C_1$–$C_6$ alkyl which is substituted by a hydroxy, sulfo or sulfato group or is phenyl which is optionally substituted by one or more halogens, acetamido group, or sulfo;

B has one of the meanings of A;
D has one of the meanings of A;
or D-B-$N^+$ in formula (b) forms a cyclic ring system and A is as defined above or
D-A-B-$N^+$ forms a mono- or bicyclic ring system;
n is 0 if Q is a group of the formula (a) and n is 1 if Q is a group of formula (b);
W— is a halogenide or the equivalent of a divalent anionic group.

2. The dyestuff as claimed in claim 1, wherein X is chlorine.

3. The dyestuff as claimed in claim 1, wherein
M is hydrogen, lithium, sodium or potassium;
Q is N-methylmorpholinium, N-ethyl morpholinium, N-ethyl piperidinium, N-1,4-diaminobicyclo (2,2,2) octane, unsubstituted pyridinium, or pyridinium which is substituted by carboxy or carboxamido;
W' is a sulfate or carbonate.

4. The dyestuff as claimed in claim 3, wherein Q is N-1,4-diaminobicyclo (2,2,2)octane, unsubstituted pyridinium, or pyridinium which is substituted by carboxy or carboxamido.

5. The dyestuff as claimed in claim 3, wherein Q is pyridinium which is substituted by carboxamido.

6. The dyestuff as claimed in claim 3, wherein Q is pyridinium which is substituted by carboxy.

7. A process for the preparation of a dye of the formula (1):

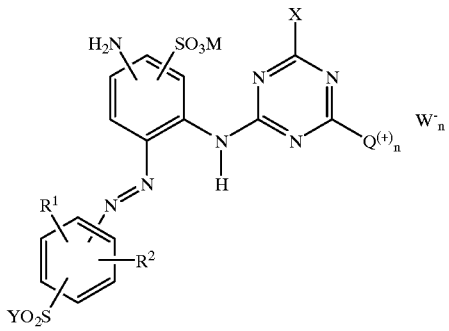

wherein

Y is vinyl or is ethyl which is substituted in the β-position by a substituent which can be eliminated by the action of an alkali, forming the vinly group;

M is hydrogen or an alkali metal;

X is fluorine, chlorine, amino, $C_1$ to $C_4$ alkoxy, phenoxy, unsubstituted anilino, or anilino which is substituted by a halogen or sulfo group, a mono-$C_1$–$C_4$ alkyl amino, or di-$C_1$ to $C_4$ alkyl amino, wherein said $C_1$ to $C_4$ alkyl is optionally substituted by sulfo, sulfato or hydroxy groups;

$R^1$ is hydrogen methyl, methoxy or sulfo;

$R^2$ has one of the meanings of $R^1$;

Q is a group of the formula (b):

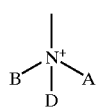

(b)

wherein

A is hydrogen, unsubstituted $C_1$–$C_6$ alkyl, or $C_1$–$C_6$ alkyl which is substituted by a hydroxy, sulfo or sulfato group or is phenyl which is optionally substituted by one or more halogens, acetamido group, or sulfo;

B has one of the meanings of A;

D has one of the meanings of A;

or D-B-N$^+$ in formula (b) forms a cyclic ring system and A is as defined above or D-A-B-N$^+$ forms a mono- or bicyclic ring system;

n is 0 if Q is a group of the formula (a) and n is 1 if Q is a group of formula (b);

W— is a halogenide or the equivalent of a divalent anionic group;

which comprise diazotizating a substituted phenylamine compound of the formula (2):

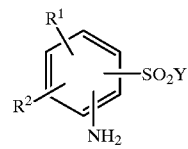

(2)

wherein $R^1$, $R^2$ and Y are as defined above, coupling onto a diaminophenlysulfonic acid, acylation of the resulting intermediate (3):

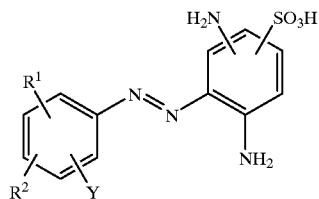

(3)

with cyanuric halogenide and subsequent reaction with a group of formula Q1:

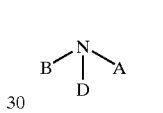

(b)' in which A, B, D and n are as defined above, and introduction of X by substitution reaction, if X is different of fluorine or chlorine, wherein $R^1$ and $R^2$ are defined above.

8. A process for dyeing hydroxy- and/or carboxamido-containing fiber material, which comprises applying the dyes as claimed in claim 1 to the material and fixation of the dyes to the material by means of:
 1. heat
 2. with the aid of an alkali or
 3. heat and with the aid of an alkali.

* * * * *